United States Patent
Zhang et al.

(10) Patent No.: US 7,804,615 B2
(45) Date of Patent: Sep. 28, 2010

(54) METHOD FOR LIMITING BIT RATE IN IP FACSIMILE AND METHOD FOR LIMITING BIT RATE IN IP FACSIMILE IN GATEWAY

(75) Inventors: Guangsheng Zhang, Shenzhen (CN); Xiaoli Jiang, Shenzhen (CN); Sinan Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 564 days.

(21) Appl. No.: 11/796,706

(22) Filed: Apr. 30, 2007

(65) Prior Publication Data

US 2008/0316525 A1    Dec. 25, 2008

Related U.S. Application Data

(63) Continuation of application No. 10/476,719, filed on Nov. 4, 2003, now abandoned.

(51) Int. Cl.
*G06F 3/12* (2006.01)

(52) U.S. Cl. ............... 358/1.15; 358/400; 358/434; 358/439; 379/100.06; 379/100.12; 709/204; 709/207

(58) Field of Classification Search ............... 358/1.15, 358/400, 434, 435, 439, 438, 442; 379/100.06, 379/100.12, 100.17; 709/246, 207, 204, 709/206, 208

See application file for complete search history.

(56) References Cited

U.S. PATENT DOCUMENTS 4,999,716 A * 3/1991 Nakamura ............ 358/434
5,351,134 A * 9/1994 Yaguchi et al. ............ 358/435
5,491,565 A * 2/1996 Naper ............... 358/468
5,515,177 A * 5/1996 Propach et al. ........ 358/426.08

(Continued)

FOREIGN PATENT DOCUMENTS

JP    2000341342 A    12/2000

(Continued)

OTHER PUBLICATIONS

International Search Report from corresponding International Application No. PCT/CN02/00423.

*Primary Examiner*—Negussie Worku
(74) *Attorney, Agent, or Firm*—Slater & Matsil, L.L.P.

(57) ABSTRACT

A method for limiting bit rate in IP facsimile, in this method the highest bit rate that the called gateway allows is determined, after the call connection is set up, the called fax machine transmits the digital identification containing the highest facsimile bit rate that the called fax machine provides, the called gateway compares the highest facsimile bit rate that the called fax machine provides with the determined highest bit rate that the called gateway allows, then selects the lower and inserts in the frame and transmits to the calling fax machine, the calling fax machine compares the bit rate with the highest bit rate that the calling fax machine itself provides, the lowest will be the highest bit rate at which message is transmitted, then the message is transmitted, confirmed, then the call connection is released. In this method, when the network becomes bad, the highest facsimile bit rate is limited through gateway to improve quality of pictures. A method for achieving limiting bit rate in IP facsimile by a gateway is also proposed in the present invention.

13 Claims, 3 Drawing Sheets

U.S. PATENT DOCUMENTS

| | | | | |
|---|---|---|---|---|
| 5,517,323 A | * | 5/1996 | Propach et al. | 358/409 |
| 5,539,531 A | * | 7/1996 | Propach et al. | 358/426.08 |
| 5,566,000 A | * | 10/1996 | Propach et al. | 358/412 |
| 5,663,807 A | * | 9/1997 | Propach et al. | 358/426.08 |
| 5,726,765 A | * | 3/1998 | Yoshida et al. | 358/412 |
| 5,881,240 A | * | 3/1999 | Asano | 709/233 |
| 5,995,600 A | * | 11/1999 | Sato | 379/100.14 |
| 6,483,600 B1 | * | 11/2002 | Schuster et al. | 358/1.15 |
| 6,836,538 B1 | * | 12/2004 | Johnston | 379/100.17 |
| 6,882,711 B1 | * | 4/2005 | Nicol | 379/93.33 |
| 6,956,677 B1 | * | 10/2005 | Cohen | 358/435 |
| 7,355,735 B1 | * | 4/2008 | Sivan et al. | 358/1.15 |
| 2003/0099338 A1 | * | 5/2003 | Bei et al. | 379/100.01 |
| 2004/0136029 A1 | * | 7/2004 | Zhang et al. | 358/1.15 |
| 2006/0028692 A1 | * | 2/2006 | Kajiwara | 358/402 |

FOREIGN PATENT DOCUMENTS

| | | |
|---|---|---|
| WO | WO 9858492 A2 | 12/1998 |
| WO | WO 0101654 A2 | 1/2001 |

* cited by examiner

METHOD FOR LIMITING BIT RATE IN IP FACSIMILE AND METHOD FOR LIMITING BIT RATE IN IP FACSIMILE IN GATEWAY

CROSS REFERENCE TO RELATED APPLICATIONS

This application is a continuation of U.S. application Ser. No. 10/476,719, filed Nov. 4, 2003 now abandoned entitled SPEED-LIMITED IP FAX METHOD AND A METHOD FOR ACHIEVING GATEWAY SPEED LIMITATION IN THE IP FAX, which application is incorporated herein by reference in its entirety.

BACKGROUND OF THE INVENTION

1. Technical Field of the Invention

The present invention relates to the field of IP facsimile, more particularly to an IP facsimile method for limiting bit rate in IP facsimile. In addition, the present invention also relates to a method for limiting bit rate in IP facsimile by a gateway, which is the key of the technical effect of the method for limiting bit rate in IP facsimile according to the invention, and because it solves certain problems, having technical effect, it is proposed in the same applicant.

2. Background of the Invention

Data is usually transmitted and switched through public switched telephone network (PSTN) in conventional facsimile technique. With the development of data communication and integrated service digital network, more and more facsimiles are transmitted by IP facsimile, i.e., a message transmitter in the PSTN and a message receiver in the PSTN are connected by Internet, and gateways are provided between the transceivers in the PSTN and Internet to modulate and demodulate the data of PSTN and IP data package.

IP facsimile can be classified to real-time IP facsimile and unreal-time one, i.e. IP storage transmission facsimile, IP real-time facsimile. IP storage transmission facsimile means that when the gateway receives the time-division multiplexing data in the PSTN, it stores the data in the transponder but not transmits the data instantly on the Internet after modulation, and when the callee needs receiving the data, such data is transmitted through the gateway. IP real-time facsimile means that when the gateway receives the time-division multiplexing data from PSTN, it transmits the data instantly on the Internet after modulation, it is real-time, which is conventionally used by us.

In the IP facsimile gateway, data are transmitted from PSTN to Internet or from Internet to PSTN, few control function is provided.

Conventional IP real-time facsimile comprises the following steps:

(1) A call connection is set up between the calling fax machine and the called fax machine, the stage is as similar as the process of that of telephone call;

(2) The calling fax machine and the called fax machine handshake, the called fax machine sends a digital identification signal frame, and the highest facsimile bit rate provided by the called fax machine is in the information word of the digital identification signal frame;

(3) The calling fax machine takes out the bit rate from the information word after receiving the digital identification signal frame, then compares the bit rate with the highest bit rate provided by the calling fax machine itself, then takes out the lower and inserts in the digital command signal frame and sends it to the called fax machine, and this bit rate is as the highest bit rate at which message is transmitted;

(4) Transmit the message;

(5) After the message is transmitted, process to the operation of confirmation, error-correction, continuous transmission for many pages;

(6) Release the facsimile call.

It is known from the implementing process of conventional technique, the bit rate of conventional IP facsimile is controlled completely by the calling fax machine and the called fax machine themselves after handshaking, and it can not be controlled by outside apparatus. Once jam happens on the Internet, the network performance will become bad, therefore the higher facsimile bit rate the worse quality of pictures, which may cause unacceptable short line etc. Gateway users hope that when the network becomes bad, gateway can limit the highest bit rate of the facsimile to improve the quality of the pictures and improve the reliability of IP facsimile. This is so-called bit rate limit performance through gateway.

SUMMARY OF THE INVENTION

An object of the present invention is to provide a method for limiting bit rate in IP facsimile and method for limiting bit rate by a gateway, which ensures that when the network is not normal, the gateway can limit the highest bit rate of facsimile to improve the quality of pictures, improve the reliability of IP facsimile.

To get above objects, the present invention provides a method for limiting bit rate in IP facsimile, i.e. a message transmitter in a PSTN and a message receiver in other PSTN are connected by Internet, and gateways are provided between PSTNs of these transceivers and Internet to modulate and demodulate data between PSTN and IP data package, a. Determine the highest bit rate that the called gateway allows;

b. The call connection between the calling fax machine and the called fax machine are set up through the PSTNs connected by Internet;

c. The calling fax machine and the called fax machine handshake, the called fax machine sends a digital identification signal frame to the called fax machine, and the highest facsimile bit rate provided by the called fax machine is in the information word of the digital identification signal frame, the called gateway takes out the bit rate from the information word after receiving the frame and compares it with the determined highest bit rate that the called gateway allows, if the bit rate is higher than the highest bit rate that the called gateway allows then the bit rate is amended to the highest bit rate that the called gateway allows, and if the bit rate is lower than the highest bit rate that the called gateway allows then the frame is normally transmitted to the caller;

d. The calling fax machine takes out the bit rate from the information word of the frame after receiving the digital identification signal frame, then compares the bit rate with the highest bit rate provided by the calling fax machine itself, then takes out the lower and insert it in the digital command signal frame and sends it to the called fax machine, and this bit rate is as the highest bit rate at which message is transmitted;

e. The calling fax machine transmits message to the called fax machine;

f. After the message is transmitted, process to the operation of confirmation, error-correction, continuous transmission for many pages;

g. Release the call connection.

Preferably, in step a, the highest bit rate that the called gateway allows is determined and the highest bit rate that the calling gateway allows is determined simultaneously; after step c, the calling gateway takes out the bit rate from the information word after receiving the digital identification signal frame and compares the bit rate with the determined highest bit rate that the calling gateway allows, if the bit rate is higher than the highest bit rate that the calling gateway allows then the bit rate is amended to the highest bit rate that the calling gateway allows, and if the bit rate is lower than the highest bit rate that the calling gateway allows then the frame is normally transmitted to the calling fax machine.

Alternately, in step a, a man-machine interface is respectively provided at the called gateway and the calling gateway, and the highest bit rate of the called gateway and the calling gateway can be input and stored in the storages of the called gateway and the calling gateway through the man-machine interface; in step c, the called fax machine takes out the bit rate from the storages and compares it with the bit rate in the digital identification signal frame.

More preferably, in step a, a performance monitor is respectively provided at the called gateway and the calling gateway to monitor the jam extent of the network in real time, and report the result to a controller prestoring several determined threshold bit rate, each threshold bit rate corresponds to a type of data indicating jam extent, when the jam extent is monitored that it has reached the threshold level that another threshold bit rate corresponding to, the controller controls the new threshold bit rate to write into the storages of the called gateway and the calling gateway; in step 3, the bit rate is taken out from the storage to compare with the bit rate in the digital identification signal frame.

The present invention also discloses a method for achieving bit rate limit in IP facsimile by a gateway, gateways are provided between the transceivers in the PSTN and Internet to modulate and demodulate data between PSTN and IP data package, a. Determine the highest bit rate that the called gateway allows;

b. The calling fax machine and the called fax machine handshake, the called fax machine sends a digital identification signal frame, and the highest facsimile bit rate provided by the called fax machine is in the information word of the digital identification signal frame, the called gateway takes out the bit rate from the information word after receiving the frame and compares it with the determined highest bit rate that the called gateway allows, if the bit rate is higher than the highest bit rate that the called gateway allows then the bit rate is amended to the highest bit rate that the called gateway allows, and if the bit rate is lower than the highest bit rate that the called gateway allows then the frame is normally transmitted to the caller;

c. The calling fax machine takes out the bit rate from the information word of the frame after receiving the digital identification signal frame, then compares the bit rate with the highest bit rate provided by the calling fax machine itself, then takes out the lower and inserts it in the digital command signal frame and sends it to the called fax machine, and this bit rate is as the highest bit rate at which message is transmitted.

Preferably, in step a, the highest bit rate that the called gateway allows is determined and the highest bit rate that the calling gateway allows is determined simultaneously; after step c, the calling gateway takes out the bit rate from the information word after receiving the digital identification signal frame and compares the bit rate with the determined highest bit rate that the calling gateway allows, if the bit rate is higher than the highest bit rate that the calling gateway allows then the bit rate is amended to the highest bit rate that the calling gateway allows, and if the bit rate is lower than the highest bit rate that the calling gateway allows then the frame is transmitted normally to the calling fax machine.

Because that a highest bit rate that the called gateway allows is determined according to the network state in the invention, the called gateway compares the bit rate with the highest facsimile bit rate that the called fax machine allows in the digital identification signal frame, and the lower will be the highest bit rate that the callee and the corresponding network can allow, then compares the bit rate with the highest facsimile bit rate that the calling fax machine allows and select the lower, therefore not only bit rate capacity of the calling and called fax machine but also the network performance and the bit rate it allows are in consideration, which ensures that when the network becomes bad, gateway can limit the highest-bit rate of facsimile to improve the quality of pictures and improve the reliability of IP facsimile.

More preferably, a highest bit rate that the calling gateway allows is determined according to the network state, and the lower bit rate generated after the called gateway and the called fax machine handshake then handshake with the highest bit rate that the calling gateway allows, then select the lowest among the three, then compare the bit rate with the highest facsimile bit rate that the calling fax machine allows at the calling fax machine side and select the lower, therefore not only the bit rate that the calling fax machine, called fax machine, the called network can allow but also that of the calling network can allow are in consideration, therefore the highest bit rate of IP facsimile is further limited, the quality of pictures and reliability of IP facsimile are both improved.

In addition, a man-machine interface is respectively provided at the called gateway and the calling gateway, and the highest bit rate of the called gateway and the calling gateway can be determined artificially through the man-machine interface, therefore the highest bit rate that the network allows can be dynamically determined according to the concrete jam extent, in turn the quality of transmission can be controlled flexibly.

Also, more preferably according to the invention, a performance monitor is provided at the called gateway and the calling gateway to monitor the jam extent in real time, and the highest bit rate that the called gateway and the calling gateway allow is dynamically adjusted in real time according to the jam extent, therefore the highest bit rate that the network allows can be dynamically adjusted in real time according to the concrete jam extent of the network, in turn more flexible control can be achieved.

DETAILED DESCRIPTION OF THE PREFERRED EMBODIMENT

Figure 1:
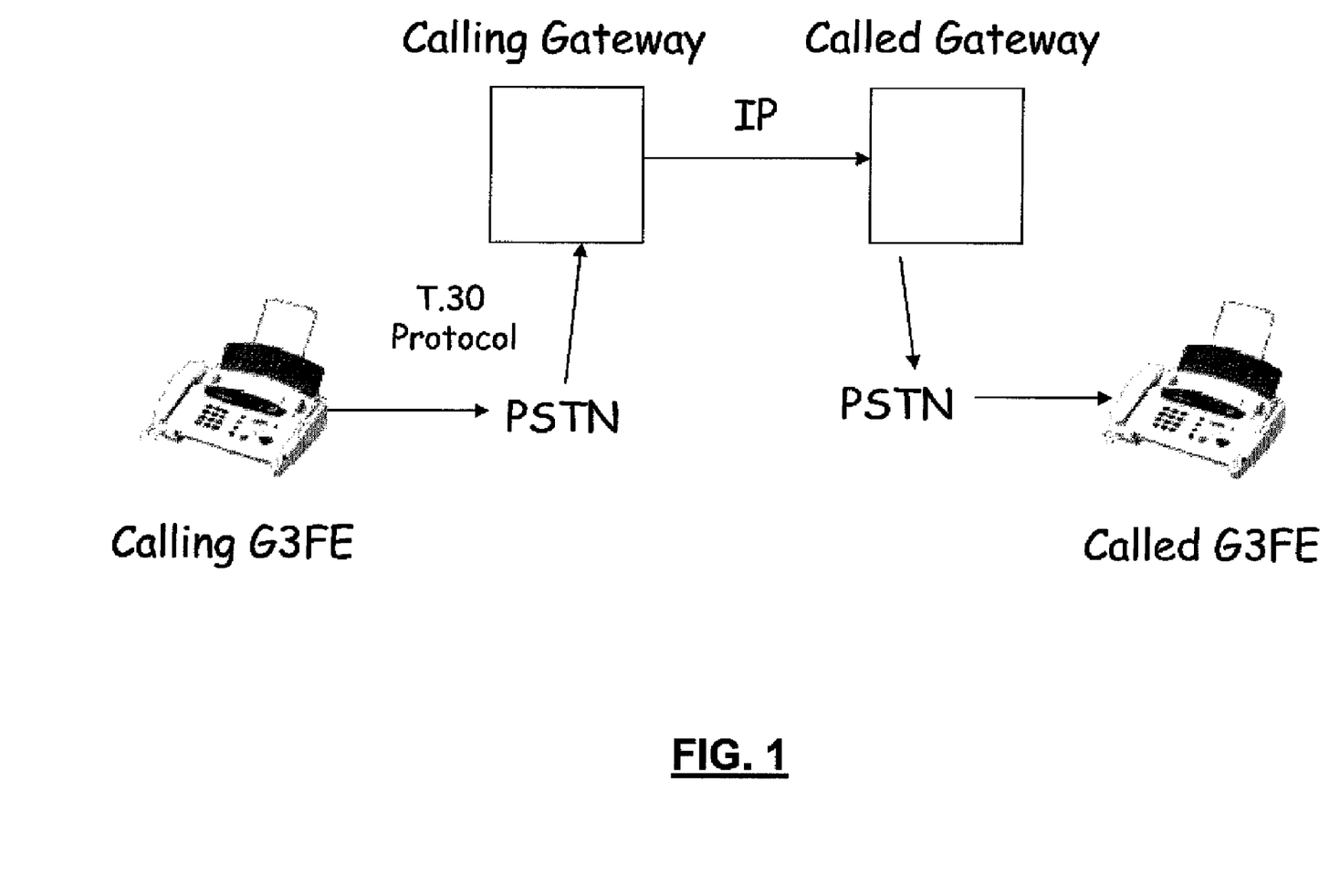
FIG. 1 shows a networking diagram for ip facsimile.
Figure 2:
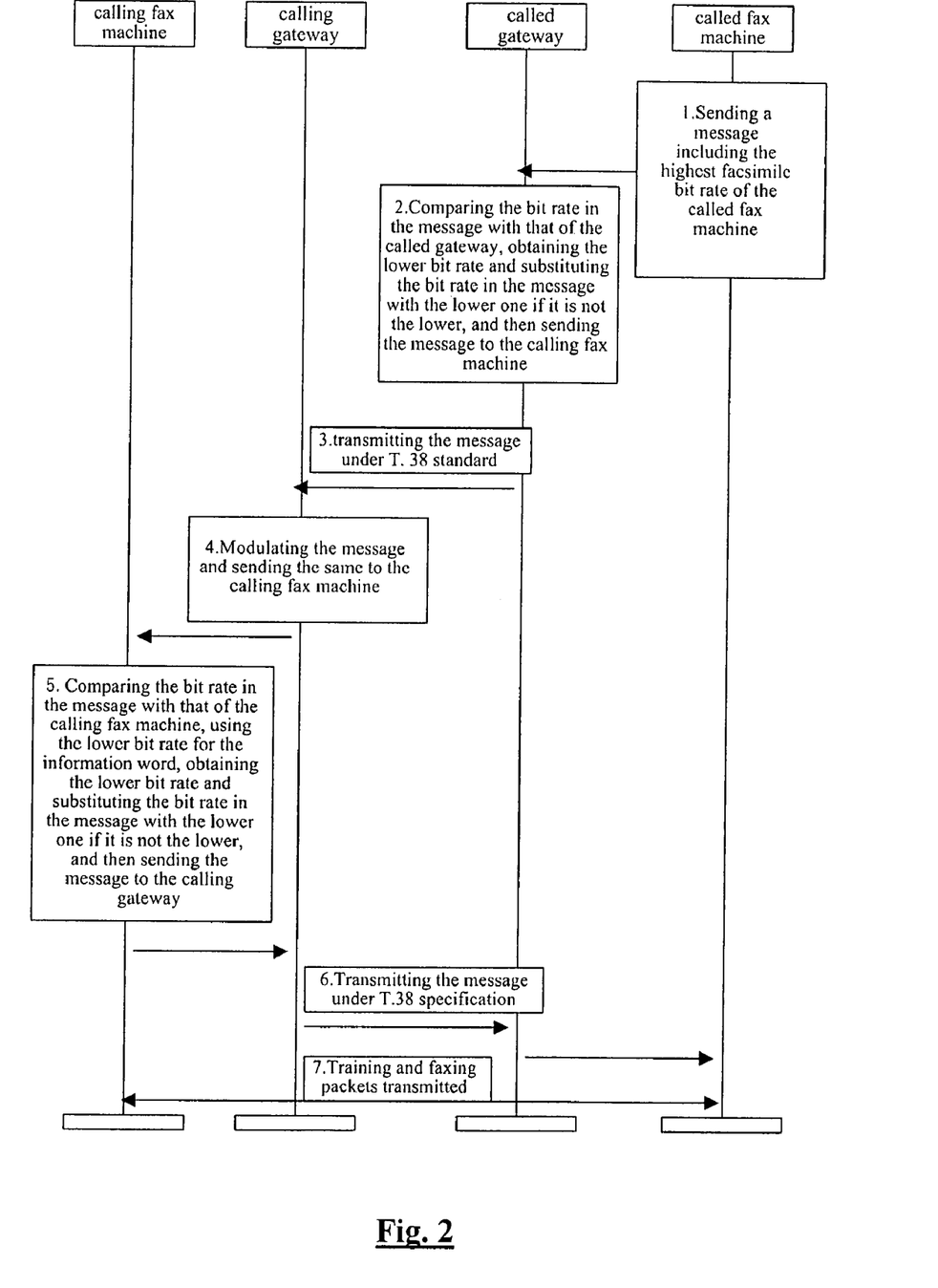
FIG. 2 schematically shows speed-limiting procedure by a gateway.
Figure 3:
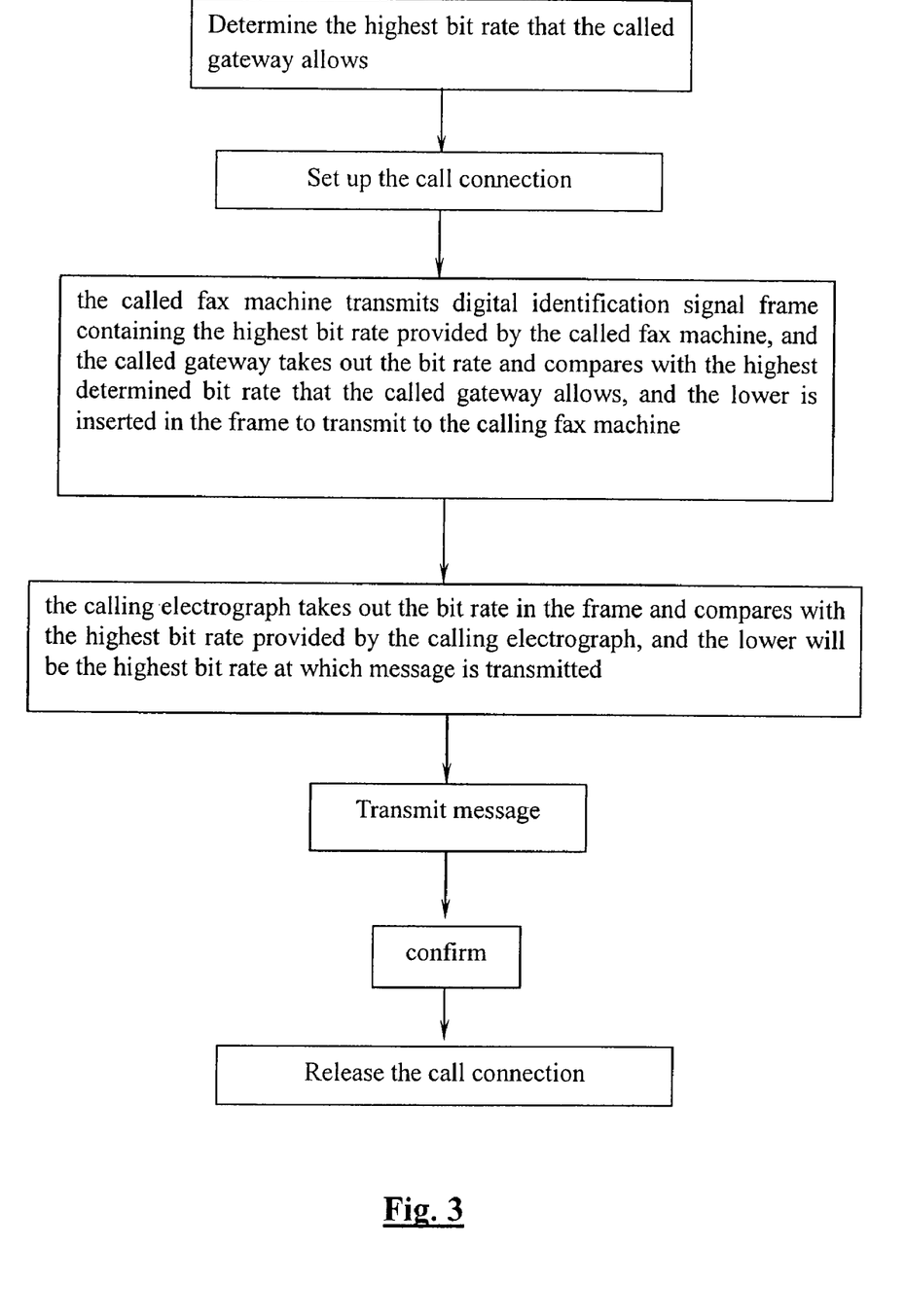
FIG. 3 is the flowchart of a method for limiting bit rate in IP facsimile according to the invention.

The detailed description of the preferred embodiment of the invention will be described in detail by referring to the drawings in FIGS. 1-3. It is easy to be understood by referring to the drawings and below description.

(1) Determining the highest bit rate that the called gateway permits, the bit rate must be one of six bit rates of 2400 bit/s, 4800 bit/s, 7200 bit/s, 9600 bit/s, 12000 bit/s, 14400 bit/s, which are conventionally used in this field. In this step, the highest bit rate of the calling gateway can be initialized at the same time to one of six bit rates, which bit rate is used usually depending upon below steps.

In the first mode, a man-machine interface is respectively provided at the called gateway and the calling gateway, then the highest bit rate available for the called gateway and the calling gateway can be input through the man-machine interface and stored in the storages of the called gateway and the calling gateway. Wherein, the network performance and jam extent are estimated by the network administrator, and which one of the six bit rates corresponding to the jam extent will be estimated upon the jam extent and experience, then the bit rate will be input to the man-machine interface and stored in the storages of the gateways to control. This method is realized artificially and the control is not exact.

The second mode is based on statistics, the six bit rates and the corresponding data range of jam extent of the network are both stored in the controller, then a performance monitor is respectively provided at the called gateway and the calling gateway to monitor the jam extent of the network in real time, which are reported to a controller, when the jam extent reaches to another threshold bit rate (one of the six), the controller writes the new threshold bit rate into the storages of the called gateway and the calling gateway. This method is realized upon statistics and therefore more exact, which continuous monitoring and adjusting the net to enable flexible control according to the jam extent of the network.

(2) Setting up call connection between the calling fax machine and the called fax machine through PSTN connected by Internet, i.e. the calling fax machine initiates a call, then the calling gateway identifies destination address of this call, to set up a path to the called gateway for the called fax machine from the called gateway, when the called fax machine receives the call, a responding tone is transmitted back through the called and calling gateway, then a call connection is set up. This process is much similar to that of telephone call.

(3) The calling fax machine and the called fax machine handshake. Wherein the called fax machine sends a digital identification signal frame to the calling fax machine, and the highest facsimile bit rate provided by the called fax machine is in the information word of the digital identification signal frame, the called gateway takes out the bit rate from the information word after receiving the frame, and compares it with the determined highest bit rate that the called gateway (said in step 1) allows, if the bit rate is higher than the highest bit rate that the called gateway allows then the bit rate is amended to the highest bit rate that the called gateway allows, and if the bit rate is lower than the highest bit rate that the called gateway allows then the frame is normally transmitted to the caller;

If the highest bit rate that the calling gateway allows is determined in step 1, then in this step, the calling gateway takes out the bit rate from the information word after receiving the digital identification signal frame and compares the bit rate with the determined highest bit rate (stored in the storage) that the calling gateway allows, which is said in step 1, if the bit rate is higher than the highest bit rate that the calling gateway allows then the bit rate is amended to the highest bit rate that the calling gateway allows, and if the bit rate is lower than the highest bit rate that the calling gateway allows then the frame is normally transmitted to the calling fax machine.

For example, suppose that the highest facsimile bit rate that the called fax machine supports is 14400 bit/s, the called fax machine transmits the digital identification signal frame containing the bit rate information to the calling fax machine, the called gateway takes out the bit rate and compares it with the determined highest bit rate 12000 bit/s that the called gateway allows, and finds that 12000 bit/s is lower than 14400 bit/s, then 14400 bit/s in the digital identification signal frame will be amended to 12000 bit/s, suppose that the highest bit rate that the calling gateway allows is not determined in step 1, then the bit rate transmitted to the digital identification signal frame of the calling fax machine is 12000 bit/s.

Suppose that the highest facsimile bit rate that the calling gateway allows is 7200 bit/s, after receiving the digital identification signal frame containing 12000 bit/s, the calling gateway compares the bit rate 12000 bit/s with the determined highest bit rate 7200 bit/s that the calling gateway allows, and finds that 7200 bit/s is lower than 12000 bit/s, then 12000 bit/s in the digital identification signal frame will be amended to 7200 bit/s, therefore the bit rate transmitted to the digital identification signal frame of the calling fax machine is 7200 bit/s.

The called fax machine transmits the digital identification signal frame through the called gateway and the calling to the calling fax machine and a sign bit and a called user's identification are transmitted simultaneously, the called user's identification contains the address of called fax machine, the typologic information identifying the state of called fax machine, after receiving the identification, the calling fax machine transmits a delivering user's identification to the called fax machine through the calling gateway and called gateway, the delivering user's identification contains the address of the calling fax machine, the typologic information identifying the state of calling fax machine.

After these steps, it is means that the calling fax machine and the called fax machine have accomplished a handshake to determine the capability on the called user's identification and the digital identification signal frame. Next, the calling fax machine transmits a training signal to the called fax machine, and when receiving the bunch, the called fax machine compares the received bunch with the prestored training signal which is the same as the calling fax machine, then calculates the bit error rate (BER), and compares it with the predetermined BER standard, if the BER is lower than the BER standard, then message can be transmitted, if the BER is higher than the BER standard, then message can not be transmitted. The lasting time of the bunch is about $1.5.+-.10\%$ s, if the calling fax machine transmits a 0 bunch containing 1000'0', the called fax machine receives 8'1' and 992'0', then BER is 0.8%, if the predetermined BER standard is 1%, 0.8% being smaller than 1%, then message can be transmitted.

(4) The calling fax machine takes out the bit rate from the information word of the frame after receiving the digital identification signal frame, then compares the bit rate with the highest bit rate provided by the calling fax machine itself, then takes out the lower and inserts it in the digital command signal frame and sends it to the called fax machine, and this bit rate is as the highest bit rate at which message is transmitted.

Suppose that the highest bit rate that the calling fax machine provides is 9600 bit/s, in the case that the highest bit rate that the calling gateway allows is not set in step 1, in the above case the bit rate in the digital identification signal frame transmitted to the calling fax machine is 12000 bit/s, 9600 bit/s being small than 12000 bit/s, then the smaller 9600 bit/s is inserted in the digital command signal frame and the frame is transmitted to the called fax machine, and this bit rate 9600 bit/s is used as the highest bit rate at which message is transmitted.

In the case that the highest bit rate that the calling gateway allows is set to be 7200 bit/s, in the above case the bit rate in the digital identification signal frame transmitted to the calling fax machine is 7200 bit/s, 7200 bit/s being small than 9600 bit/s, then the smaller 7200 bit/s is inserted in the digital command signal frame and the frame is transmitted to the called fax machine, and this bit rate 7200 bit/s is used as the highest bit rate at which message is transmitted.

(5) The calling fax machine transmits message to the called fax machine, and the process is known by the person of ordinary skill in the art, therefore it is not discussed here.

(6) After the message is transmitted, process to the operation of confirmation, error-correction, continuous transmission for many pages. During this process, when one or all pages of facsimile is finished, the calling fax machine transmits the continuous transmission for many pages, finishing identifier to the called fax machine through the calling, called gateway, after receiving the identifier the called fax machine transmits the continuous transmission for many pages, finishing confirmation identifier to the calling fax machine through the called, calling gateway.

(7) Release the call connection, this step corresponds to the process of setting up the call connection in step 2, and this part is similar to the process of releasing the telephone call and is known by the person of ordinary skill in the art, therefore it is not discussed here.

Moreover, a method for limiting bit rate in IP facsimile by a gateway is proposed in the present invention, this method corresponds to said steps 1, 3, 4, so it is not discussed here. The method is key to realize the technical effect of the method for limiting bit rate in IP facsimile in the present invention, and because it has solved certain technical problems, having technical effect, they are proposed in the same applicant.

What is claimed is:

1. A method for processing an IP facsimile, wherein a calling fax machine in a PSTN and a called fax machine in the PSTN are connected by Internet, and a called gateway and a calling gateway are provided between transceivers in the PSTN and the Internet to modulate and demodulate data between a PTSN data package and an IP data package, the method comprising:
   a. setting a highest bit rate available for the called gateway;
   b. setting up a call connection between the calling fax machine and the called fax machine via the PSTN connected by the Internet;
   c. the calling fax machine and the called fax machine handshaking to determine a highest available bit rate, wherein the called fax machine sends a digital identification signal frame, in which an information word includes a highest facsimile bit rate provided by the called fax machine, the called gateway taking out the highest facsimile bit rate from the information word after receiving the frame and comparing the highest facsimile bit rate with a highest bit rate available for the called gateway, if the highest facsimile bit rate is higher than the highest bit rate available for the called gateway then the highest available bit rate is amended to the highest bit rate available for the called gateway, and then the frame is transmitted to the calling fax machine;
   d. the calling fax machine taking out the highest available bit rate from the information word of the frame after receiving the digital identification signal frame, then comparing the highest available bit rate with the highest bit rate provided by the calling fax machine, then creating a digital command signal frame that includes a bit rate that is the lower of the highest available bit rate from the information word or the highest bit rate provided by the calling fax machine and sending the digital command signal frame to the called fax machine, the bit rate included in the digital command signal frame being the highest bit rate at which a message is transmitted between the calling fax machine and the called fax machine.

2. The method of claim 1, wherein in step a, the highest bit rate available for the called gateway and a highest bit rate available for the calling gateway are determined simultaneously; after step c, the calling gateway taking out the highest available bit rate from the information word after receiving the digital identification signal frame and comparing the highest available bit rate with a determined highest bit rate available for the calling gateway, if the highest available bit rate is higher than the highest bit rate available for the calling gateway then the highest available bit rate is being amended to the highest bit rate available for the calling gateway, and if the highest available bit rate is lower than the highest bit rate available for the calling gateway then the frame is normally transmitted to the calling fax machine.

3. The method of claim 2, wherein in step a, a man-machine interface is respectively provided at the called gateway and the calling gateway, by which the highest bit rate available for the called gateway and the calling gateway can be input and stored in storages of both the called gateway and the calling gateway; in step c, the called fax machine taking out the bit rate and comparing with the bit rate in the digital identification signal frame.

4. The method of claim 2, wherein in step a, a performance monitor is provided respectively at the called gateway and the calling gateway to monitor a jam extent of a network in real time, and a result being reported to a controller prestoring with several predefined threshold bit rates, each of the threshold bit rates corresponding to the jam extent, when the jam extent monitored reaches another threshold bit rate, the controller writing the new threshold bit rate into the storages of both the called gateway and the calling gateway; in step c, the bit rate being taken out from the storage to compare with the bit rate in the digital identification signal frame.

5. The method of claim 2, wherein step b comprises: the calling fax machine initiating a call, then the calling gateway identifying a destination address of this call, and setting up a path via the called gateway to the called fax machine, when the called fax machine receives the call, a responding tone being transmitted back via the called and calling gateway to indicate a call connection having been set up.

6. The method of claim 2, wherein in step c, the called fax machine transmitting the digital identification signal frame a sign bit and a called user's identification via the called and the calling gateways to the calling fax machine, the called user's identification including an address of the called fax machine, a typologic information identifying a state of the called fax machine, after the called user's identification being received, the calling fax machine transmitting a delivering user's identification to the called fax machine via the calling and called gateways, the delivering user's identification including an address of the calling fax machine, the typologic information identifying a state of the calling fax machine.

7. The method of claim 1, wherein in step a, a man-machine interface is respectively provided at the called gateway and the calling gateway, by which the highest bit rate available for the called gateway and the calling gateway can be input and stored in storages of both the called gateway and the calling gateway; in step c, the called fax machine taking out the bit rate and comparing with the bit rate in the digital identification signal frame.

8. The method of claim 1, wherein in step a, a performance monitor is provided respectively at the called gateway and the calling gateway to monitor a jam extent of a network in real time, and a result being reported to a controller prestoring with several predefined threshold bit rates, each of the threshold bit rates corresponding to the jam extent, when the jam extent monitored reaches another threshold bit rate, the controller writing the new threshold bit rate into the storages of both the called gateway and the calling gateway; in step c, the bit rate being taken out from the storage to compare with the bit rate in the digital identification signal frame.

9. The method of claim 1, wherein step b comprises: the calling fax machine initiating a call, then the calling gateway identifying a destination address of this call, and setting up a path via the called gateway to the called fax machine, when the called fax machine receives the call, a responding tone being transmitted back via the called and calling gateway to indicate a call connection having been set up.

10. The method of claim 1, wherein in step c, the called fax machine transmitting the digital identification signal frame a sign bit and a called user's identification via the called and the calling gateways to the calling fax machine, the called user's identification including an address of the called fax machine, a typologic information identifying a state of the called fax machine, after the called user's identification being received, the calling fax machine transmitting a delivering user's identification to the called fax machine via the calling and called gateways, the delivering user's identification including an address of the calling fax machine, the typologic information identifying a state of the calling fax machine.

11. The method of claim 10, wherein in step c, after the calling fax machine and the called fax machine handshaking upon the called user's identification and the digital identification signal frame, the calling fax machine transmitting a training signal to the called fax machine, and when the training signal being received, the called fax machine comparing the training signal with a prestored training signal which is the same as the training signal in the calling fax machine, and calculating a BER, comparing the BER with a predetermined BER standard, if the BER being lower than the BER standard, then the message being transmitted, if the BER being higher than the BER standard, the message being not transmitted.

12. The method of claim 1, further comprising:
e. the calling fax machine transmitting the message to the called fax machine at a bit rate no greater than the bit rate included in the digital command signal frame;
f. after the message has been transmitted, processing a confirmation and/or error correction; and
g. releasing the call connection.

13. A method for achieving a bit rate limit through a gateway, a called gateway and a calling gateway are provided between transceivers in a PSTN and Internet to modulate and demodulate data between the PSTN and an IP data package,
a. determining a highest bit rate for the called gateway;
b. a calling fax machine and a called fax machine handshaking to determine an available highest bit rate, the called fax machine sending a digital identification signal frame, and a highest facsimile bit rate for the called fax machine being packaged in an information word of the digital identification signal frame, the called gateway taking out the highest facsimile bit rate from the information word after receiving a frame and comparing the highest facsimile bit rate with a determined highest bit rate for the called gateway, if the highest facsimile bit rate is higher than the determined highest bit rate then the highest facsimile bit rate being amended to the determined highest bit rate, and if the highest facsimile bit rate is lower than the determined highest bit rate then the frame being transmitted to the calling fax machine;
c. the calling fax machine taking out the highest facsimile bit rate from the information word of the frame after receiving the digital identification signal frame, then comparing the highest facsimile bit rate with a highest bit rate supported by the calling fax machine, then taking out a bit rate that is the lower of the highest facsimile bit rate or the highest bit rate supported by the calling fax machine and adding to a digital command signal frame and sending to the called fax machine, and the bit rate being as the highest bit rate at which message is transmitted.

* * * * *

UNITED STATES PATENT AND TRADEMARK OFFICE
CERTIFICATE OF CORRECTION

PATENT NO.        : 7,804,615 B2                                            Page 1 of 1
APPLICATION NO.   : 11/796706
DATED             : September 28, 2010
INVENTOR(S)       : Zhang et al.

It is certified that error appears in the above-identified patent and that said Letters Patent is hereby corrected as shown below:

On the Title Page, insert item --(30) Foreign Application Priority Data, July 25, 2001 (CN)………..
2001 0 1124418--.
In Col. 7, line 34, claim 1, delete "PTSN" and insert --PSTN--.

Signed and Sealed this

Sixteenth Day of November, 2010

David J. Kappos
*Director of the United States Patent and Trademark Office*